United States Patent [19]
Takahashi et al.

[11] Patent Number: 5,715,904
[45] Date of Patent: Feb. 10, 1998

[54] BAFFLE STRUCTURE FOR A MOTORCYCLE

[75] Inventors: Atsuhiko Takahashi; Yasuhiro Nakayama, both of Saitama, Japan

[73] Assignee: Honda Giken Kogyo Kabushiki Kaisha, Tokyo, Japan

[21] Appl. No.: 473,577

[22] Filed: Jun. 7, 1995

[30] Foreign Application Priority Data

Aug. 31, 1994 [JP] Japan .................. 6-206991

[51] Int. Cl.⁶ .................................. B60K 11/06
[52] U.S. Cl. .............. 180/229; 180/68.1; 180/68.4
[58] Field of Search .................. 180/68.1, 68.4, 180/68.6, 219, 229; 74/551.8, 558.5

[56] References Cited

U.S. PATENT DOCUMENTS

| | | | |
|---|---|---|---|
| 3,834,249 | 9/1974 | Bothwell | 74/551.8 |
| 3,933,136 | 1/1976 | Burst | 180/68.1 |
| 4,564,081 | 1/1986 | Hamane | 180/229 |
| 4,641,723 | 2/1987 | Takanashi et al. | 180/219 |
| 4,703,825 | 11/1987 | Mikami | 180/229 |
| 4,709,774 | 12/1987 | Saito | 180/229 |

FOREIGN PATENT DOCUMENTS

| | | | |
|---|---|---|---|
| 206299 | 12/1986 | European Pat. Off. | 180/68.1 |
| 99992 | 4/1991 | Japan | 180/68.4 |
| 3-79238 | 12/1991 | Japan . | |

*Primary Examiner*—Anne Marie Boehler
*Attorney, Agent, or Firm*—Birch, Stewart, Kolasch & Birch, LLP

[57] ABSTRACT

A shroud is disposed outside a radiator. Ribs are provided which project from the inner surface of the shroud and abut the outer surface of the radiator so that portions other than the ribs are used as baffle passages for introducing running an air flow into air flow ports. Guide ribs for introducing an air flow in the air flow ports are provided which project from an inner surface of the shroud in front of the radiator, thereby enhancing the rectifying effect.

14 Claims, 5 Drawing Sheets

BAFFLE STRUCTURE FOR A MOTORCYCLE

BACKGROUND OF THE INVENTION

1. Field of the Invention

The present invention relates to a baffle structure capable of enhancing a cooling effect of a radiator of a motorcycle.

2. Description of Background Art

The motorcycle of a type in which the outside of a radiator is surrounded by a shroud having an air flow port is known, for example, as disclosed in Examined Japanese Patent Publication No. HEI 3-79238. The structure shown in FIG. 7 is also known, wherein a pair of right and left radiators 51 (only one side is shown in FIG. 7) are disposed in an intermediate portion between a fuel tank 52 and a front fork 53, and the outside of the radiators are respectively surrounded by a shroud 54. The shroud 54 is advantageously integrally formed of synthetic resin, and the base end portion thereof is fixed on the fuel tank 52 by means of an attaching member 55. A plurality of air flow ports 56, 57 are provided on the base end portion side of the shroud FIG. 8 is a sectional view taken along line 8—8 of FIG. 7. As shown in FIG. 8, ribs R are vertically arranged in two rows on the inner surface of the shroud 54 in such a manner as to project inwardly. The leading end portions of the ribs R are made to be abutted on the outer surface of the radiator 51 for protecting the shroud 54 from being deformed due to a force applied by the feet of a rider.

In addition, FIG. 8 shows only one side relative to the body center line, and the radiator 51, the shroud 54 and the like are symmetrically disposed on the other side.

According to the prior art, during operation, air flows from the front surface to the rear surface of the radiator 51 for enhancing the heat-radiation of the radiator 51 as shown in FIG. 8, the passing of air through the radiator side is prevented by ribs R for allowing air to flow along the radiation surface (fins). However, by preventing the air flow as shown in FIG. 8, the other flow of cooling air is prevented, as a result of which the smooth flow is obstructed. In other words, the flow passing through the fins is pushed in the direction perpendicular to the flow.

SUMMARY OF THE INVENTION

To solve the above-described and other problems, a baffle passage for allowing an air flow to pass therethrough is formed between the outer surface of a radiator and the inner surface of a shroud, and ribs for introducing air into an air flow port of the shroud project from an inner surface of the shroud.

Since ribs project from the inner surface of a shroud for introducing an air flow into an air flow port, the rectifying effect of the air flow passing through a radiator can be enhanced. Moreover, by allowing an air flow to pass through a baffle passage formed between the radiator and the shroud, the end portion of the radiator is also cooled, and the flow of air around the radiation surface (fins) is made smooth by the rectified flow of air.

Advantageously, the baffle passage is positioned on an upstream side corresponding to a position of the air flow port. The baffle structure may include two baffle passages and the air port may include two air ports corresponding to the two baffle passages.

The ribs may include a plurality of ribs locally abutting the outer surface of the radiator. The baffle passage is formed between the plurality of ribs.

The ribs may include a plurality of guide ribs project in front of the radiator. The air port may include an upper and lower air port and the plurality of guide ribs may include an upper guide rib and an intermediate guide rib which introduce an air flow into the upper air port and the intermediate guide rib and a lower guide rib which introduce an air flow into the lower air port. The intermediate guide rib may be V-shaped. An upper rib may be integrally formed with the upper guide rib, an intermediate rib may be integrally formed with the intermediate guide rib, and a lower rib may be integrally formed with the lower guide rib.

The objects of the present invention may also be met by providing a motorcycle having a baffle structure including a radiator and a shroud having an air flow port, the shroud surrounding the outside of the radiator. A baffle passage which allows an air flow to pass therethrough is formed between the outside of the radiator and the inner surface of the shroud. Ribs which introduce an air flow into the air flow port project from the inner surface of the shroud.

The motorcycle advantageously further includes a handle pipe, a throttle grip mounted on the handle pipe, a throttle housing assembly around the handle, and a cover surrounding the throttle housing assembly. The cover may be made of rubber and include a hole through which the handle pipe is inserted.

Finally, the objects of the present invention are further provided by a method of cooling a radiator of a motorcycle including the steps of: surrounding the radiator with a shroud, providing an air flow port in the shroud, forming a baffle passage between the outside of the radiator and an inner surface of the shroud, providing ribs projecting from the inner surface of the shroud, and introducing an air flow into the air flow port using the ribs.

The step of providing projecting ribs may include locally abutting a plurality of ribs on the outer surface of the radiator. The forming step may include forming the baffle passage between the plurality of ribs.

The step of providing projecting ribs may include providing a plurality of guide ribs projecting in front of the radiator. The introducing step may include introducing an air flow into an upper air port of the air port through an upper guide rib and an intermediate guide rib and introducing an air flow into a lower air port of said air port through the intermediate guide rib and a lower guide rib. The method may further include integrally forming the upper guide rib with an upper rib locally abutting the outer surface of the radiator, integrally forming the intermediate guide rib with an intermediate rib locally abutting the outer surface of the radiator, and integrally forming the lower guide rib with a lower rib locally abutting the outer surface of the radiator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
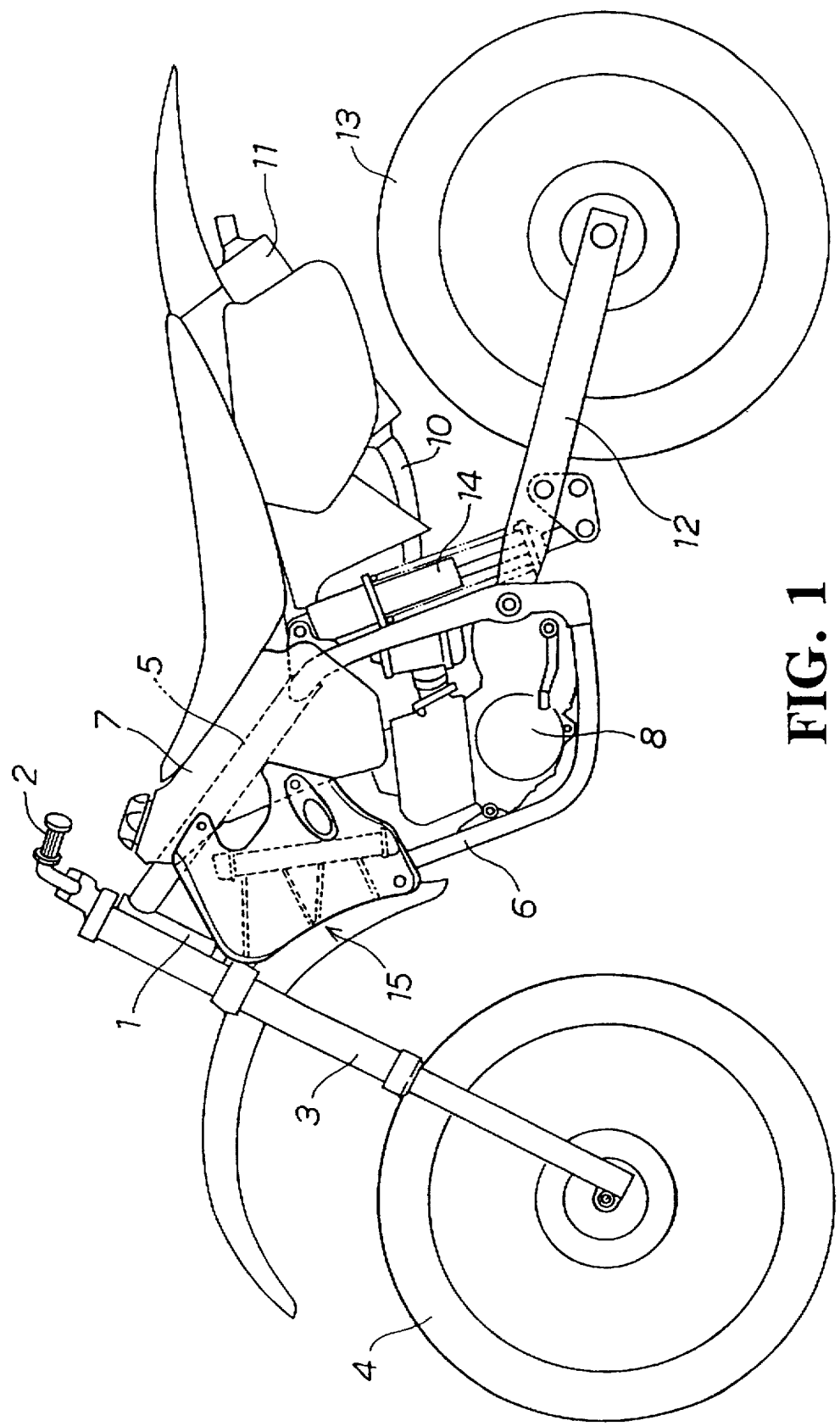
FIG. 1 is a view showing the appearance of a motorcycle to which a baffle structure of the present invention is applied.
Figure 2:
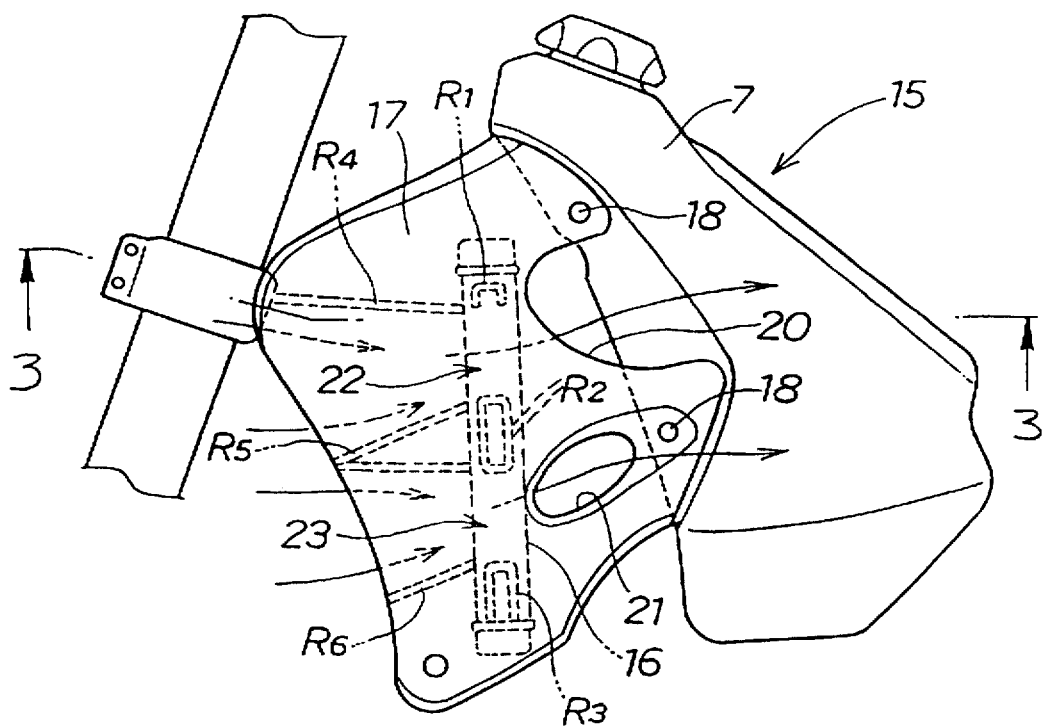
FIG. 2 is a partially enlarged view of the baffle structure.
Figure 3:
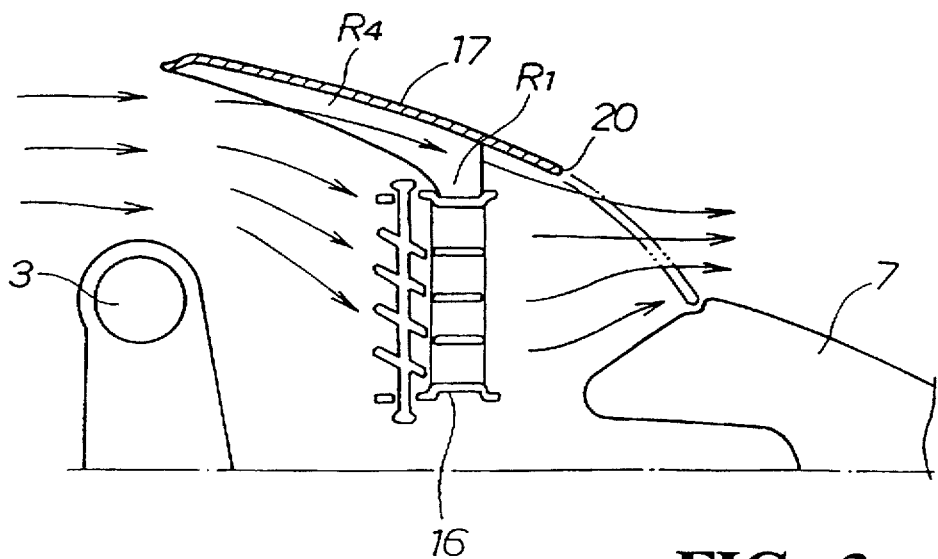
FIG. 3 is a sectional view taken along line 3—3 of FIG. 2, which shows only one side relative to the center line of a vehicular body.

One embodiment of the present invention will be described with reference to the drawings. FIG. 1 is a view showing the appearance of a motorcycle to which the baffle structure of the present invention is applied. FIG. 2 is an enlarged view of a radiator device. FIG. 3 is a sectional view taken along line 3—3 of FIG. 2, which shows only one side relative to the body center line.

As shown in FIG. 1, a motorcycle with a radiator device of the present invention includes a handle 2 mounted at the upper end of a steering shaft 1 turnably inserted in a head pipe 1, a front fork 3 operated by the handle 2, a front wheel 4, a main pipe 5 extending obliquely and downwardly from the upper end portion of the head pipe 1, and a down tube 6 extending obliquely and downwardly from the lower end of the head pipe 1. A fuel tank 7 is provided on the upper portion of the main pipe 5 so as to be astride the main pipe 5.

An engine 8 is mounted on the down tube 6 under the fuel tank 7, and an exhaust pipe 10 and a muffler 11 are provided rearwardly from the engine 8. A rear fork 12 and a rear wheel 13 are provided on the rear side of the vehicle, and a damper 14 is connected to the rear fork 12.

A radiator device 15 for cooling the engine 8 is provided between the main pipe 5 and the down tube 6, and in front of the fuel tank 7. Advantageously, the engine is of a water-cooling type, and cooling water circulated in a water jacket of the engine 8 is introduced in the radiator device 15 for cooling the radiator device 15 by accelerating heat-radiation by the air flow.

As shown in FIGS. 2 and 3, the radiator device 15 is composed of a pair of radiators 16 (only one side is shown in FIGS. 2 and 3), and the outside of each radiator 16 is surrounded by a shroud 17. The shroud 17 is advantageously made of synthetic resin. The base end portion of the shroud 17 is mounted on the side surface of the fuel tank 7 by a plurality of screws 18. A portion of the shroud 17, positioned in back of the radiator 16, is formed with air flow ports 20, 21 for allowing cooling air to escape after passing through the radiator 16.

An inner portion of the shroud 17, which is opposed to the outer surface of the radiator 16, is provided with a plurality of ribs R1, R2, R3 locally abutting the outer surface of the radiator 16. Between the ribs R1, R2, R3, gaps are provided between the inner surface of the shroud 17 and the outer surface of the radiator 16, which are taken as baffle passages 22, 23. The baffle passages 22, 23 are positioned on the upstream side corresponding to the positions of the air flow ports 20, 21 of the shroud 17 for allowing air, after passing through the baffle passages 22, 23, to smoothly escape from the air flow ports 20, 21.

Guide ribs R4, R5, R6, for introducing an air flow into the air flow ports 20, 21 projecting from the inner surface of a portion of the shroud 17. The shroud 17 is positioned in front of the radiator 16. Namely, an air flow is introduced in the upper air flow port 20 by the upper guide rib R4 and the intermediate guide rib R5, and an air flow is introduced into the lower air flow port 21 by the intermediate guide rib R5 and the lower guide rib R6. For this purpose, the intermediate guide rib R5 is formed in a V-shape with the tapered end.

In addition, the upper rib R1 and the guide rib R4, the intermediate rib R2 and the guide rib R5, and the lower rib R3 and the guide rib R6 may be respectively integrally formed.

With this construction, the rectifying effect of the air flow passing through the radiator 16 is enhanced, to provide a smooth flow of air, thus increasing the cooling effect. The heat-radiation effect of the outer end portion of the radiator 16 is also enhanced by the baffle passages 22, 23.

In the motorcycle shown in FIG. 1, a throttle housing around the handle 2 is provided with a cover. The construction thereof will be briefly described with reference to FIGS. 4 to 6. A throttle grip 26 is mounted on a handle pipe 25 as shown in FIG. 4, and a grip housing 27 is mounted in a throttle grip pipe at the leading end of the throttle grip 26.

Figure 4:
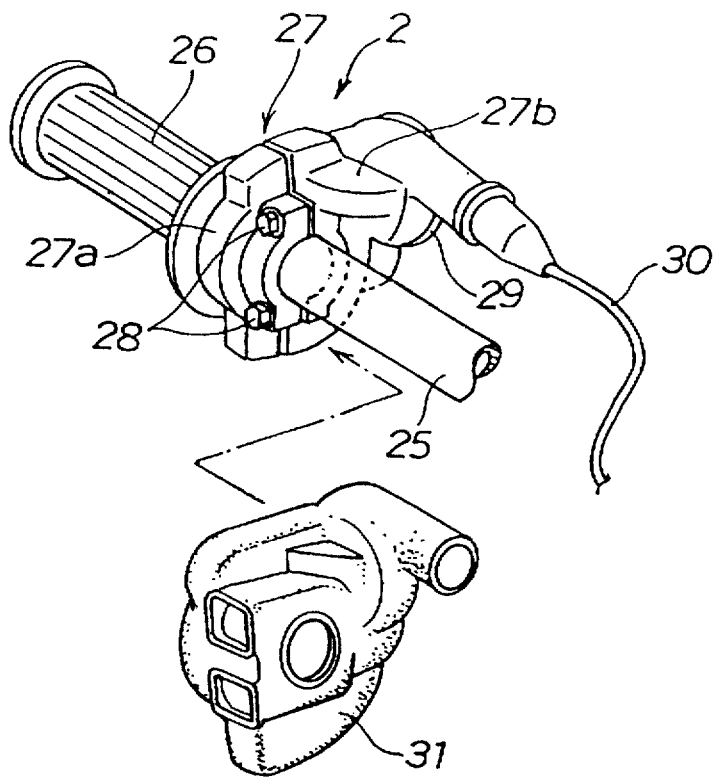
FIG. 4 is an exploded view in perspective of an assembly of a throttle housing.

As shown in FIG. 4, a housing 27 includes half-divided bodies 27a, 27b fixed on the grip housing 27 by means of a flange bolt 28. A housing cover 29 is fixed on the rear side of the housing divided body 27b by means of a connector. In addition, a throttle cable 30 is provided. Conventionally, the grip housing 27, housing cover 29 and the like connected in such a state are exposed as they are, so that muddy water, earth and sand, etc. are easy to permeate from the mating surfaces of the housing divided bodies 27a, 27b and the connecting surface of the housing cover 29.

Figure 5:
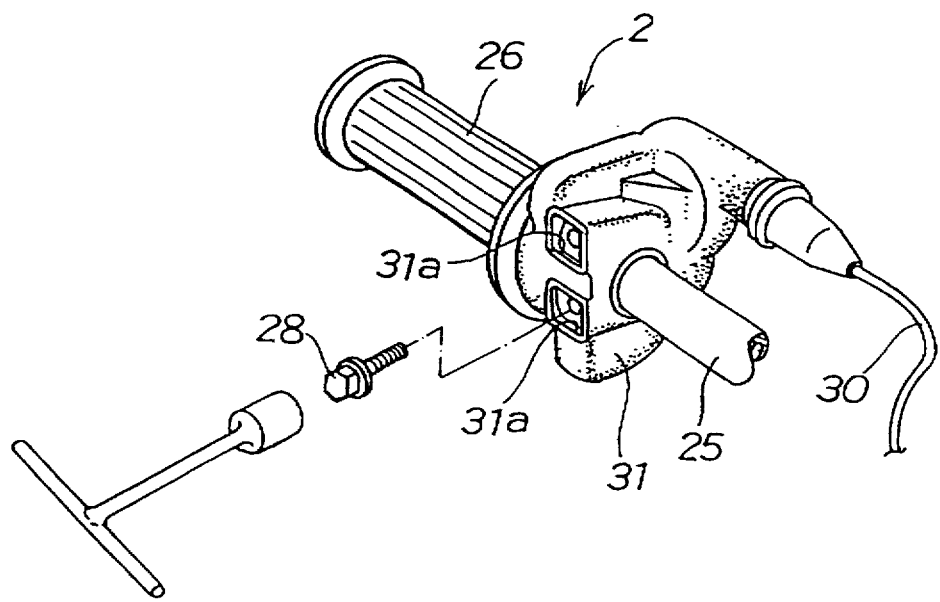
FIG. 5 is a view showing the function of the throttle housing assembly.
Figure 6:
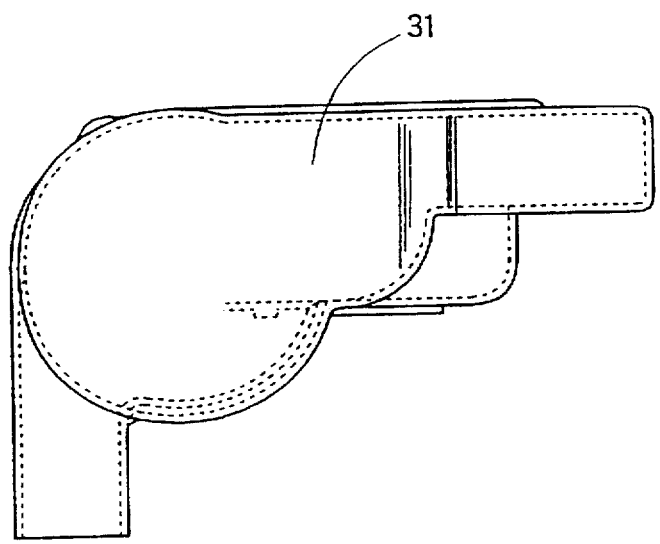
FIG. 6 is a plan view of a cover.
Figure 7:
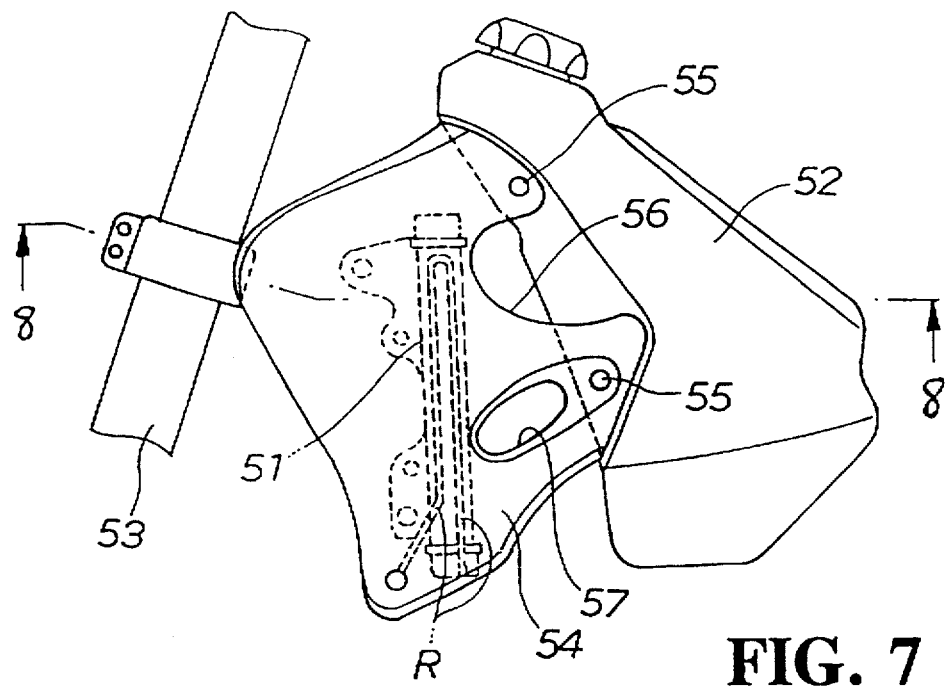
FIG. 7 is a partially enlarged view of a prior art baffle structure.
Figure 8:
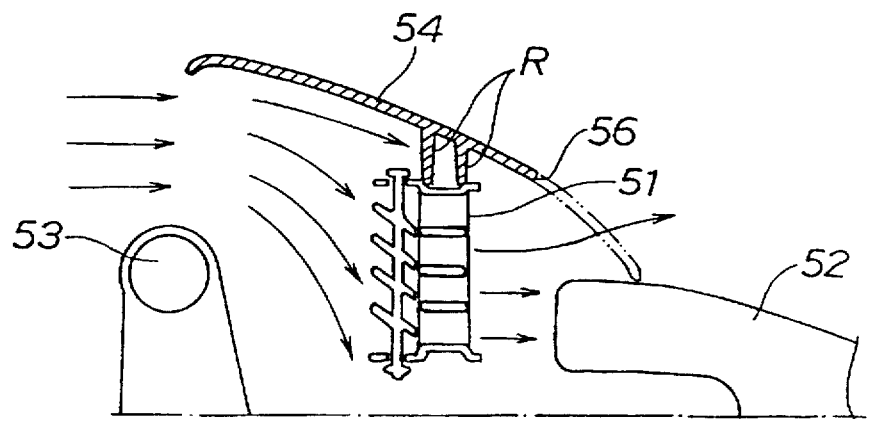
FIG. 8 is a sectional view taken along line 8—8 of FIG. 7.

In this embodiment, the whole throttle housing assembly is covered with a cover 31 made of rubber. The cover 31 is first slid over the handle pipe 25, and then shifted to be fitted after the build-up of the throttle housing assembly, as shown in FIG. 5. The cover 31 made of rubber is elastically expansible, and thus, it can be smoothly fitted. By covering the whole throttle housing assembly with the cover 31, as shown in FIG. 6, it becomes possible to prevent the permeation of muddy water, earth, and sand.

In the cover 31, an opening portion 31a is provided at a portion corresponding to the flange bolt 28. Accordingly, as shown in FIG. 5, the flange bolt 28 can be fastened and loosened when the cover 31 is fitted on the handle pipe 25. This is advantageous, for example, in maintenance of the fastening portion.

As described above, in the baffle structure of the present invention, since a baffle passage for allowing an air flow to pass therethrough is provided between the outer surface of a radiator and the inner surface of a shroud, the whole radiator can be effectively cooled. Moreover, since ribs are provided which project from the inner surface of the shroud for introducing an air flow into an air flow port, it becomes possible to enhance the rectifying effect of air passing through the radiator, and hence to increase the cooling effect.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A baffle structure for a motorcycle comprising:
a radiator having an outer surface;
a shroud having an air flow port for emitting an air flow having passed through said radiator, said shroud surrounding at least a portion of said outer surface of said radiator;
a baffle passage formed between said outer surface of said radiator and an inner surface of said shroud for allowing the air flow to pass therethrough; and
a plurality of ribs locally abutting the outer surface of said radiator for introducing the air flow into said air flow port, said plurality of ribs projecting from said inner surface of said shroud.

2. The baffle structure according to claim 1, wherein said baffle passage is positioned to supply said air flow to said air flow port.

3. The baffle structure according to claim 2, wherein said baffle passage comprises two baffle passages and said air flow port comprises two air flow ports corresponding to said two baffle passages.

4. The baffle structure according to claim 1, wherein said baffle passage is formed between said plurality of said ribs, the inner surface of said shroud and the outer surface of said radiator.

5. The baffle structure according to claim 1, wherein said plurality of ribs project in front of said radiator.

6. The baffle structure according to claim 5, wherein said air port comprises an upper and lower air port and said plurality of ribs comprise an upper guide rib and an intermediate guide rib which introduce an air flow into said upper air port and said intermediate guide rib and a lower guide rib which introduce an air flow into said lower air port.

7. The baffle structure according to claim 6, wherein said intermediate guide rib is V-shaped.

8. The baffle structure according to claim 6, and further comprising an upper rib integrally formed with said upper guide rib, an intermediate rib integrally formed with said intermediate guide rib, and a lower rib integrally formed with said lower guide rib.

9. A method of cooling a radiator of a motorcycle comprising the steps of:
surrounding at least a portion of said radiator with a shroud;
providing an air flow port in said shroud;
forming a baffle passage between an outer surface of said radiator and an inner surface of said shroud;
providing a plurality of ribs projecting from said inner surface of said shroud, said plurality of ribs locally abutting on said outer surface of said radiator;
introducing the air flow into said air flow port using said plurality of ribs; and
outputting from said air flow port the air flow having passed throught said radiator.

10. The method according to claim 9, wherein said step of providing the plurality of ribs projecting from said inner surface of said shroud includes mounting said plurality of ribs in front of said radiator.

11. The method according to claim 10, wherein said introducing step comprises introducing an air flow into an upper air port of said air port through an upper guide rib and an intermediate guide rib and introducing an air flow into a lower air port of said air port through said intermediate guide rib and said lower guide rib.

12. The method according to claim 11, and further comprising integrally forming said upper guide rib with an upper rib locally abutting the outer surface of said radiator, integrally forming said intermediate guide rib with an intermediate rib locally abutting the outer surface of said radiator, and integrally forming said lower guide rib with a lower rib locally abutting the outer surface of said radiator.

13. The method according to claim 9, wherein said forming step comprises positioning said baffle passage on an upstream side corresponding to a position of said air flow port.

14. The method according to claim 9, wherein said forming step comprises forming said baffle passage between said plurality of ribs.

* * * * *